United States Patent
Hazelwood et al.

(10) Patent No.: US 7,808,534 B2
(45) Date of Patent: Oct. 5, 2010

(54) SMEAR REDUCTION IN CCD IMAGES

(75) Inventors: Michael John Hazelwood, Chelmsford (GB); Samuel Harrison Hutton, Chelmsford (GB); Clifford Robert Weatherup, Chelmsford (GB)

(73) Assignee: E2V Technologies (UK) Limited, Chelmsford Essex (GB)

( * ) Notice: Subject to any disclaimer, the term of this patent is extended or adjusted under 35 U.S.C. 154(b) by 862 days.

(21) Appl. No.: 10/565,204

(22) PCT Filed: Jul. 21, 2004

(86) PCT No.: PCT/GB2004/003161

§ 371 (c)(1),
(2), (4) Date: Feb. 23, 2007

(87) PCT Pub. No.: WO2005/013605

PCT Pub. Date: Feb. 10, 2005

(65) Prior Publication Data

US 2007/0242145 A1    Oct. 18, 2007

(30) Foreign Application Priority Data

Jul. 21, 2003    (GB)    ................. 0316994.3

(51) Int. Cl.
*H04N 3/14*    (2006.01)
*H04N 5/335*    (2006.01)
(52) U.S. Cl. ............... 348/294; 348/295; 348/296; 348/297; 348/312
(58) Field of Classification Search ......... 348/294–324, 348/241, 243, 248–255; 250/208.1
See application file for complete search history.

(56) References Cited

U.S. PATENT DOCUMENTS

| 4,490,744 | A  |   | 12/1984 | Levine |         |
|-----------|----|---|---------|--------|---------|
| 5,040,064 | A  | * | 8/1991  | Cok    | 348/392.1 |
| 5,105,276 | A  | * | 4/1992  | Schrock | 348/241 |
| 6,313,883 | B1 | * | 11/2001 | Thaler  | 348/630 |

FOREIGN PATENT DOCUMENTS

EP    0 569 142 A1    11/1993

(Continued)

OTHER PUBLICATIONS

Mylonas S. et al., "Adaptive Noise Canceling and Edge Detection In Images Using PVM on a NOW", 10th Mediterranean Electrotechnical Conference, vol. 2, May 29, 2000, pp. 681-684.
British Search Report dated Nov. 18, 2003 issued in GB 0316994.3.

*Primary Examiner*—Yogesh K Aggarwal
(74) *Attorney, Agent, or Firm*—Venable LLP; Robert Kinberg; Robert S. Babayi

(57) ABSTRACT

Vertical and horizontal smear in images produced by a CCD imager can be compensated for by detecting the boundaries of the smear and substituting data from an alternative part of the image, or interpolated data within those boundaries. Vertical, or frame transfer, smear can also be compensated for by producing an error signal from charge accumulated during frame transfer and corresponding to one or more masked rows of the CCD imager. This error signal can be subtracted from the line signals corresponding to each row of the CCD images receiving radiation during image acquisitions. The CCD imager includes a multiplication register. The dynamic range of the imager may be extended by varying the gain of the multiplication register, for example on a line-by-line or frame-by-frame basis.

19 Claims, 4 Drawing Sheets

FOREIGN PATENT DOCUMENTS

| | | |
|---|---|---|
| EP | 0 777 380 | 6/1997 |
| EP | 0 856 990 | 8/1998 |
| EP | 0 920 221 A2 | 6/1999 |
| EP | 0 866 501 B1 | 12/2004 |
| EP | 0 866 601 B1 | 12/2004 |
| GB | 2 364 461 | 1/2002 |

* cited by examiner

SMEAR REDUCTION IN CCD IMAGES

This invention relates to charge coupled devices (CCDs) and in particular the improvement of CCD performance at low incident light levels.

EP-A-0,866,501 describes the use of a multiplication register which uses impact ionisation to amplify the charge stored in an output register. The technique described in that patent application is extremely effective and can produce very high gains with little noise. Consequently, devices using multiplication registers are well suited for operation at very low incident light levels.

One artifact of the multiplication register is referred to as horizontal smearing. This occurs when charge is not fully transferred from one cell of the register to the next. Where an image acquired in very low light levels includes a bright object, such as a car headlight at night, the localised bright source will tend to be smeared across the image as charge which has not been transferred properly is amplified on subsequent clock pulses. In a generally bright scene, such residual charge may not be noticeable, but in a generally low light level image it can produce an undesirable streak.

A similar streaking can be produced in the vertical direction as a consequence of the manner in which images are acquired and then clocked out. In the images described in EP-A-0,866,501 the image comprises an area array sensor which acquires light simultaneously for all pixels of the array. After a set integration time, the charge stored is clocked out line by line to a store.

Where the device is operating in very low light levels, localised bright sources tend to be smeared vertically as, during the clocking out process, which happens from the bottom of the array, lines above the localised bright source are exposed to that bright source for a short time as they are clocked past the source. Although the exposure time is small compared to the integration time, the localised bright source is so much brighter than the background that the light captured shows up on the image as a vertical streak. This streak will extend both below and above the localised bright source, the streak above having been contributed by the clocking out of that frame and the streak below by the clocking out of the previous frame.

The problem occurs whether or not the lines of accumulated charge are clocked directly to an output register or via an intermediate store. It is a problem that is inherent in any CCD that reads out images line by line, and is not related to the use of a multiplication register.

One approach to reducing vertical smear, also known as frame transfer smear, is to block the light to the CCD array during frame transfer. This may be achieved by introducing a shutter into the optical path which is synchronised to the frame transfer. However, practical shutters have limited performance and the most suitable shutters are affected by changes in temperature.

The invention, in its various aspects, aims to address the problems of horizontal and vertical smear.

Broadly, a first aspect of the invention compensates for vertical and/or horizontal smears by using edge detection techniques to locate smeared areas. Data is then substituted into these smeared areas.

More specifically, there is provided apparatus for compensating image signals produced by a CCD imager for smears, the CCD imager including a multiplication register for multiplying charge produced by the CCD imager, the apparatus comprising: an image data analyser for detecting the boundaries of a smear; and an image data replacer for replacing data between the boundaries of a detected smear with alternative image data, wherein the image data analyser is arranged to detect the boundaries of horizontal smears produced by incomplete charge transfer in the multiplication register.

Preferably, the image data analyser comprises means for detecting the boundaries of a smear by detecting rates of change in the image data greater than a predefined limit Embodiments of the invention have the advantage that smears can be simply detected and corrected for as part of the signal processing performed on acquired image data. In one embodiment of the invention, the alternative data used for substitution is derived from image pixels neighbouring the detected smear. In another embodiment, the alternative data is derived by interpolation which has the advantage of looking more natural.

Preferably, the image data analyser analyses the image line by line to detect intensity gradients greater than the predefined limit and so indicative of a smear. The analysis may be performed using a kernel to analyse a portion of the image data at a time.

The kernel may be used with a sliding window moveable across the image to analyse the complete image.

Preferably, a temporal integrator integrates two or more images acquired by the CCD imager prior to boundary detection by the image data analyser. This has the advantage of eliminating random noise, for example caused by thermal effects, prior to boundary detection.

Preferably, a coordinate extractor extracts the coordinates of detected smear boundaries and provides these coordinates to the image data replacer.

Embodiments of this aspect of the invention have the advantage that they can be used to detect and compensate for vertical frame transfer smear which arises as lines are read out from the active image area. It may also be used to compensate for horizontal smear caused by incomplete charge transfer in a multiplication register. Embodiments of the invention are particularly suited to use in low light level environments where the transitions between dark areas and smeared signals have a large gradient.

A second aspect of the invention compensates for frame transfer smear by deriving an error signal indicative of charge accumulated during read out of a line. This error signal is then subtracted from the actual line signals. Masked lines of the image, which are the last to be read out, and which are only exposed to incident light during frame transfer, may be used to derive the error signal.

Preferably, there is provided apparatus for compensating for frame transfer smear in a CCD imager, wherein: the imager comprises an image area having a plurality of rows of pixels for accumulating charge during an image acquisition period, each row corresponding to a line of the image, an output register for receiving accumulated charge row by row during a transfer mode to produce line signals, and at least one row of pixels masked from incident radiation and arranged on the side of the image area opposite the side on which pixels are transferred to the output register, the apparatus comprising a subtractor for subtracting a signal corresponding to the charge accumulated during the transfer mode and transferred to the output register as lines corresponding to the at least one masked row, from the line signals corresponding to the rows of the image area.

This aspect of the invention allows frame transfer smears to be compensated for reliably where pixels of the image have not been saturated and detail in the image is recovered. It may be used in conjunction with the first aspect of the invention.

Preferably the CCD sensor comprises a plurality of masked rows. The error signal may be generated from an average of the masked row line signals acquired during the frame transfer period.

A third aspect of the invention increases the dynamic range of the CCD imager by varying the gain on parts of an image or selected images. For example, the gain may vary between two levels on alternate lines or frames.

Preferably, there is provided apparatus for controlling a CCD imager, the imager comprising an image area for acquiring charge from incident radiation, an output register for receiving acquired charge from the image area during a transfer mode, and a multiplication register for multiplying charge received from the output register, the apparatus comprising a gain controller for controlling the gain of the multiplication register to vary the gain of the multiplication register for selected images or portions of images.

Preferably, the gain is alternatively low and high on alternative lines or images although other low/high ratios may be used.

Embodiments of this aspect of the invention have the advantage that the dynamic range of the CCD imager may be extended thus allowing detail to be presented in both dark and light areas of the image. This in turn improves the usefulness of the smear compensating techniques of the first and second aspects of the invention.

Embodiments of the invention will now be described, by way of example only, and with reference to the accompanying drawings, in which.

Figure 1:
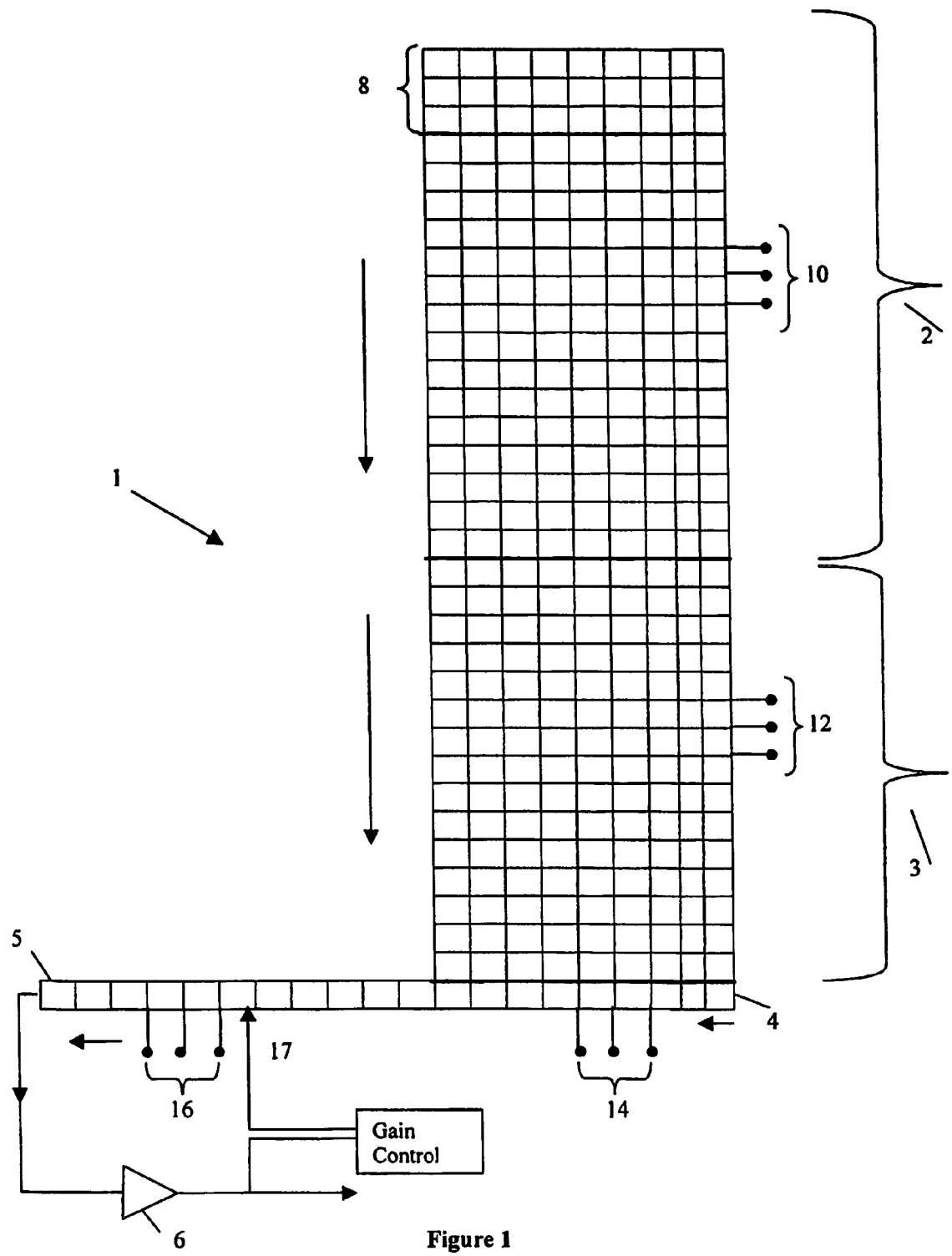
FIG. 1 is a schematic view of a known CCD image having a multiplication register.

The CCD device 1 illustrated in FIG. 1 comprises an image area 2, a store section 3 and an output or read-out register 4. The output register 4 is extended in a linear direction to provide a multiplication register 5, whose output is connected to a charge detection circuit 6. At the top of the image area 2 is a number, for example 3, of masked rows 8 which are shielded from incident radiation. It is commonplace to have such masked rows in a CCD array although they are often located at the bottom of the array. The remaining active image area comprises several hundred lines of pixels, for example 288 lines.

During operation, radiation incident at the active lines of the image area is converted to signal charge, the magnitude of which is representative of the intensity of the radiation imposing on the pixels of the active image array. After an image acquisition period of typically 20 ms, drive pulses are applied to control electrodes 10 and 12 to transfer the charge accumulated at the active pixels to the store section 3. The pixels are transferred line by line with a typical transfer time of 1 μs per line, with the bottom line being transferred out first.

When a complete line has been transferred, drive signals are also applied to control electrodes 12 of the store to cause charge to be transferred line by line to the output register 4. When a row of charge is transferred to the output register, drive pulses are applied to control electrodes 14 of the output register to transfer charge from the elements of the output register to the multiplication register 5. Charge multiplication is achieved in the multiplication register by applying high amplitude drive pulses via multiplication register electrodes 17 to transfer charge from one element to the next and to increase the amount of charge by impact ionisation. Each signal charge packet stored at the output register 4 undergoes an identical multiplication process as it proceeds through the elements of the multiplication register.

Figure 2:
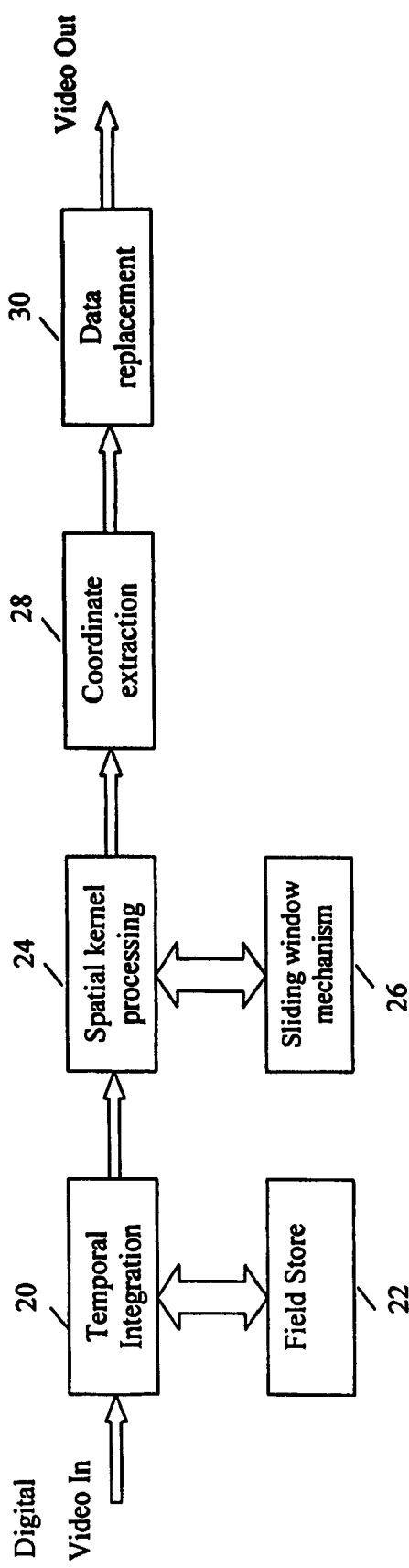
FIG. 2 is a schematic view of a horizontal and vertical smear reduction circuit.

Referring now to FIG. 2, a first aspect of the invention aims to eliminate horizontal and/or vertical smearing by using edge and/or gradient detection to identify smeared areas and then to remove the smeared areas and replace them with image data substituted from elsewhere, or interpolated image data.

The processing of the signal using the circuit of FIG. 2 is performed on the output from the charge detection circuit 6. Thus, the input to the smear reduction circuit of FIG. 2 is a digital video signal generated from the CCD imager of FIG. 1. The input signal is first passed to a temporal integrator 20 which is connected to a field or frame store 22. The temporal integrator reduces the effects of random noise which is particularly visible at low light levels and averages signals over a number of fields. The term field is used here to refer to one image captured by the CCD imager. Where the output is a conventional 2:1 interlace video signal, one image captured by the CCD imager will form a field of the video signal. However, if no interlacing were used, an image captured by the CCD imager would form a frame of the output video signal.

The output of the temporal integrator is passed to a spatial kernel processor 24 which itself is coupled to a sliding window mechanism 26. The kernel processor and sliding window are used to search the image or a specified area of the image to detect vertical or horizontal smears and relies on the fact that the smear will produce a large rate of change between its boundaries compared with that of neighbouring real image pixels. In its simplest form, the kernel processes the image on a line by line basis searching for a gradient that exceeds predefined thresholds. This detects one edge of the smear on that line. The other edge is found by continuing until a negative gradient is found that exceeds the predefined threshold. The sliding window mechanism 26 is used to provide an efficient identification of the smeared areas and defines a vertical edge detector mask. This may be a n×n array of multipliers, n may typically be 3, which is moved across the image to multiply the image in groups of pixels. Other methods of edge or transition detection may be used.

A coordinate extractor 28 extracts and stores the coordinates of the smeared edges. The information masked by the optical overload must then be regenerated. If the CCD pixels have been saturated then no information can be retrieved from the smear area and so an approximation to the original image must be made. This task is performed by a data replacement unit 30. The data replacement unit may use any conventional data replacement technique. For example it may average neighbouring pixels to produce an approximation of the smeared area or it may interpolate the intensity data between the edges of the smear. The latter is presently preferred as it results in a more natural image as a whole.

The circuit of FIG. 2 may also be used for a horizontal smear detection and compensation by concentrating on the horizontal axis to detect the height of the horizontal smear and correct it on the manner described. Typically, the two types of smear detection and compensation will be performed one after the other.

Referring back to FIG. 1, the CCD array includes a number of masked rows of CCD elements which do not receive any incident light. In a second aspect of the invention, these rows are used to compensate for vertical, or frame transfer, smear either instead of or in addition to the compensation technique referred to with reference to FIG. 2.

The masked lines are typically used to correct for thermal noise. However, as they are located at the top of the array, they can be used to derive a signal that also compensates for vertical smear. The charge accumulated in each row of the array is passed row by row to the output register 4. The contents of the dark or masked rows may also be passed to the output register. As these rows are at the top of the array, they will be clocked line by line through the active array during which time they will accumulate charge. This accumulated charge is approximately equal to the vertical smear and can be used to derive a correction signal which can be subtracted from the signal generated from the active rows of the area array. This is possible as the smear is constant both in position and intensity from row to row.

An integration time of 20 ms was previously mentioned for image acquisition. This is typical for CCIR based TV systems. The transfer rate is typically 1 µs per line. Thus, if a bright object illuminates 10 pixels vertically, the corresponding pixels in the rows above the bright object, including the masked rows will accumulate charge from that bright object for 10 µs. Thus, if the bright source is less than 2000 times brighter than the average scene it will still be possible to recover information by subtracting the smear signal from all pixels. This is based on the requirement that the smeared signals are not saturated so removing the ability to compensate by subtraction of the derived smear signal. In practice, this technique works at even higher levels of overload as the average illumination level is usually less than CCD saturation. Similarly, if the bright source illuminates more than 10 pixels, the level of overload before saturation will be reduced as the time exposed to the bright source increases.

Where saturation occurs, the technique described with respect to FIG. 2 may be used to compensate further for vertical smear.

Figure 3:
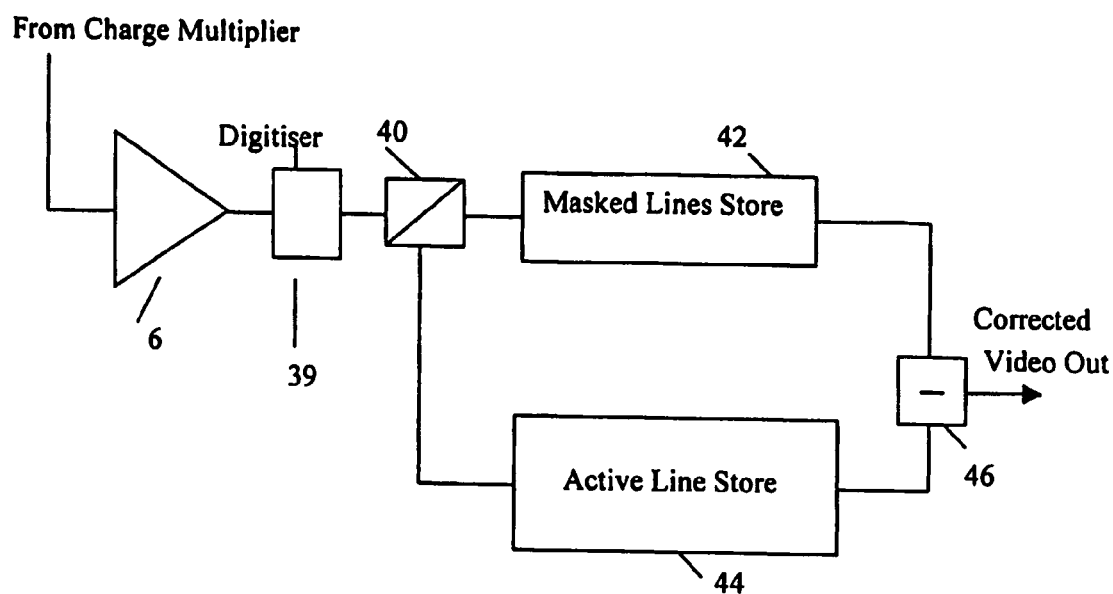
FIG. 3 is a schematic view of a subtraction circuit embodying a second aspect of the invention.

Thus, in the embodiment of this aspect of the invention illustrated in FIG. 3, the output from the charge multiplier 5 (FIG. 1) is passed via amplifier 6 and a digitiser 39 to a switch which, for example under the control of a counter, passes the masked lines to a first store 42 and the active lines to an active line frame store 44. It is necessary to store the active lines as the masked lines are read out after the active lines. The output from the masked line store is then subtracted from the output of the active line store by subtractor 46 which is an n-bit parallel subtractor, where n is the number of bits per pixel. The error signal may be simply the signal stored for one dark row or may be the average of the pixel values for two or three rows. The output of the frame store 44 is read out sequentially line by line so that the error signal is subtracted from each line in turn.

In both the embodiments of the first and second aspects of the invention described above, smear compensation will only be effective where there are relatively limited levels of overload. It is therefore desirable to extend the dynamic intra-scene range of the CCD imager. A third aspect of the invention varies the CCD multiplication gain on a line by line or field (image) by field basis. This enables the intra-scene dynamic range to be extended greatly. Using the image of FIG. 1, the range may be varied by 500-1000 times.

Figure 4:
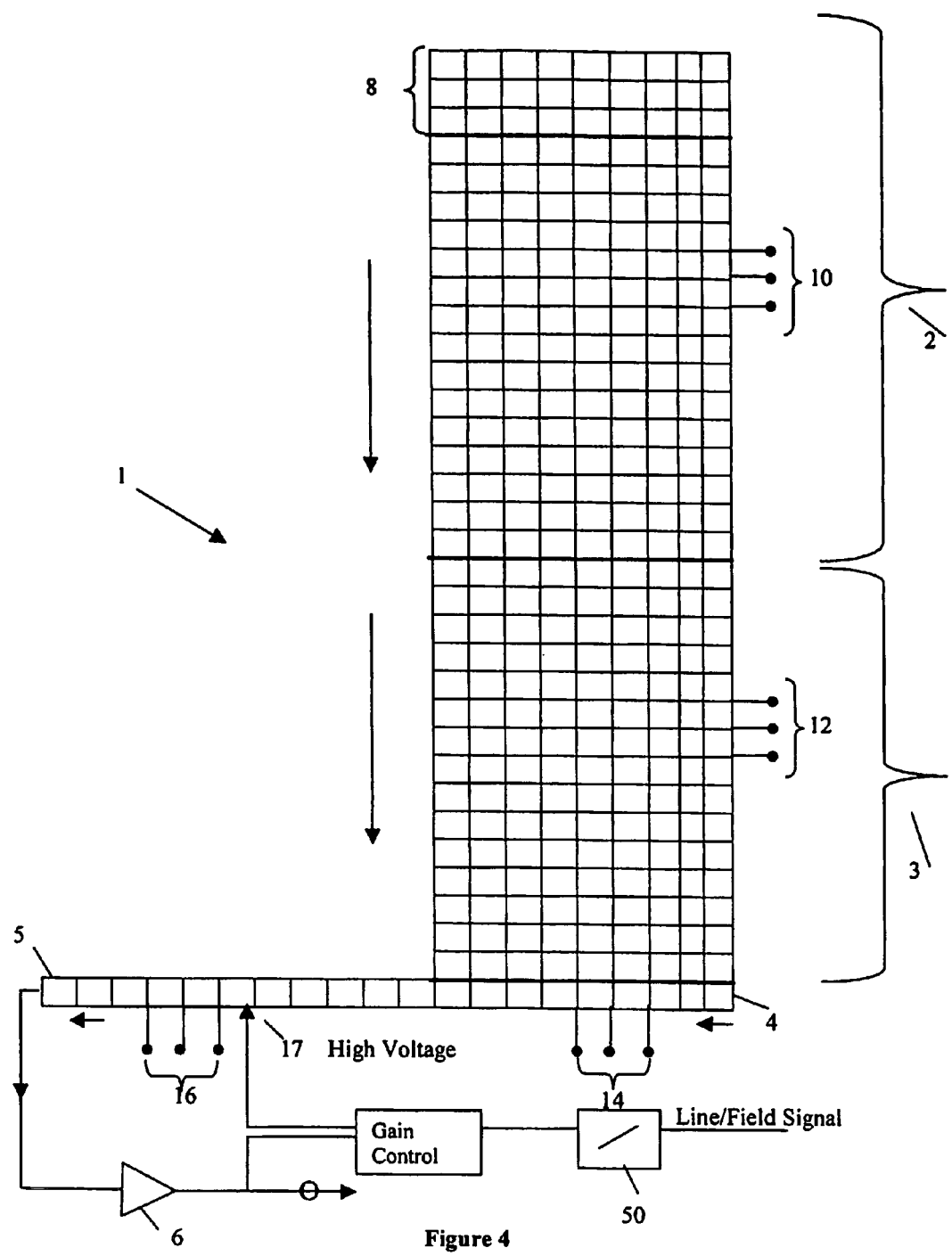
FIG. 4 is a similar view to FIG. 1, modified according to a third aspect of the invention.

Referring to FIG. 4, a modification of FIG. 1 is shown in which the gain control is, itself, controlled by a switch 50 which is switched every line, for example by a system clock which controls the voltages to the electrode 17. This may be switched every line so that odd lines are set to a gain of, for example, 1000 whereas for even numbered lines the gain is set to 1. On odd lines, details in the darkest parts of the image are displayed but bright sources would be clipped due to the limited capacity of the multiplication register to amplify the charge generated by bright sources. At the even lines, there will be insufficient multiplication to display dark areas of the image but detail in bright areas can be seen. The alternate lines can be combined by the digital signal processing portion of the imager to produce a pair of identical lines each displaying detail in both light and dark areas of the screen. Instead of alternate high/low gain, other arrangements could be made. For example every third or fourth etc. line could be a low gain or high gain line. Similarly, the processing performed on the high and low gains may be more sophisticated than simple addition.

This aspect of the invention reduces the vertical resolution of the image. However, this is not a serious problem with low light level images where resolution is already limited by a number of other factors.

As an alternative, the gain could be varied such that it is set low for one image (field) and then high for the next image (field). As in the line by line example, this 1:1 low/high ratio could be varied. The two images can then be combined in a similar manner to the line by line range although the frame update rate is reduced by half for a 1:1 ratio.

Various modifications to the embodiments described above are possible and will occur to those skilled in the art. Although described in relation to CCD images using multipliers, the vertical (frame transfer) smear compensation techniques and dynamic range extensions technique are not limited to such arrangements and may be implemented on conventional CCDs. Similarly, none of the aspects of the invention described are limited to CCD arrays in which lines or frames are stored before being output to an output register.

Embodiments of the invention in its various aspects have a number of advantages. The first aspect of the invention reduces the effects of horizontal smear due to charge retention in the multiplication register. This is especially advantageous at the low light levels to which CCD imagers using multipliers are particularly well suited. Additionally, each of the first and second aspects reduce or eliminate the effects of vertical smear by processing the image after acquisition. The third aspect of the invention has the advantage of increasing the dynamic range of the CCD array. This increases the usefulness of the smear compensation techniques by reducing the risk of overloading the output from individual CCD cells.

Various other modifications are possible and will occur to those skilled in the art without departing from the scope of the invention which is defined by the attached claims.

The invention claimed is:

1. Apparatus for compensating image signals produced by a CCD imager for smears, the CCD imager including an image area having a plurality of rows of pixels for accumulating charge during an image acquisition period, each row corresponding to a line of the image, an output register for receiving accumulated charge row by row during a transfer mode to produce line signals, at least one row of pixels being masked from incident radiation arranged on the side of the image area opposite the output register, and a multiplication register for multiplying charge produced by the CCD imager, the apparatus comprising:

an image data analyser for detecting the boundaries of a smear;

an image data replacer for replacing data between the boundaries of a detected smear with alternative image data, wherein the image data analyser is arranged to detect the boundaries of horizontal smears produced by incomplete charge transfer in the multiplication register; and a subtractor for subtracting a signal corresponding to the charge accumulated during the transfer mode and transferred to the output register as lines corresponding to the at least one masked row, from the line signals corresponding to the rows of the image area.

2. Apparatus according to claim 1, wherein the image data analyser comprises means for detecting the boundaries of a smear by detecting rates of change in the image data greater than a predefined limit.

3. Apparatus according to claim 1, wherein the alternative image data is derived from image pixels neighbouring the detected smear.

4. Apparatus according to claim 1, wherein the alternative image data is derived by interpolation of image data.

5. Apparatus according to claim 2, wherein the image data analyser analyses the image line by line to detect intensity gradients greater than the predefined limit.

6. Apparatus according to claim 1, wherein the image data analyser comprises a kernel for analysing a portion of the image data at a time.

7. Apparatus according to claim 6, wherein the kernel has a sliding window to define the portion of the image being analysed by the kernel and moveable across the image to analyse the complete image.

8. Apparatus according to claim 1, comprising a temporal integrator for integrating at least two images acquired by the CCD imager prior to boundary detection by the image data analyser.

9. Apparatus according to claim 1, comprising a coordinate extractor for extracting the coordinates of the smear boundaries and providing the extracted coordinates to the image data replacer.

10. Apparatus according to claim 1, wherein the image data analyser detects the boundaries of vertical smears produced on transfer of image data from pixels of the CCD imager.

11. A CCD imaging apparatus comprising the apparatus according to claim 1.

12. A combination comprising a CCD imager and an apparatus for compensating image signals produced by the CCD imager for smears, wherein:
the CCD imager comprises:
an image area having a plurality of rows of pixels for accumulating charge during an image acquisition period, each row corresponding to a line of the image;
an output register for receiving accumulated charge row by row during a transfer mode to produce line signals, at least one row of pixels being masked from incident radiation arranged on the side of the image area opposite the output register; and
a multiplication register for multiplying charge produced by the CCD imager; and
the apparatus comprises:
an image data analyser for detecting the boundaries of a smear;
an image data replacer for replacing data between the boundaries of a detected smear with alternative image data, wherein the image data analyser is arranged to detect the boundaries of horizontal smears produced by incomplete charge transfer in the multiplication register; and
a subtractor for subtracting a signal corresponding to the charge accumulated during the transfer mode and transferred to the output register as lines corresponding to the at least one masked row, from the line signals corresponding to the rows of the image area.

13. The combination according to claim 12, wherein the CCD imager further comprises a store arranged between the image area and the output register.

14. The combination according to claim 12, wherein the CCD sensor comprises a plurality of masked rows.

15. The combination according to claim 14, wherein a line signal is generated corresponding to each masked row and the error signal is generated from an average of the masked row line signals.

16. The combination according to claim 12, comprising a gain controller for varying the gain of the multiplication register for selected images or portions of images.

17. The combination according to claim 16, wherein the gain is adjusted to be relatively high and relatively low on alternate lines of the image.

18. The combination according to claim 17, wherein the gain is adjusted to be relatively high and relatively low on alternate images.

19. A CCD camera comprising the CCD imager and the apparatus according to claim 12.

* * * * *